(12) United States Patent
Putman

(10) Patent No.: US 6,338,793 B1
(45) Date of Patent: *Jan. 15, 2002

(54) PROCESS FOR THE DESULFURIZATION OF A DIESEL FRACTION

(75) Inventor: Hugh M. Putman, Houston, TX (US)

(73) Assignee: Catalytic Distillation Technologies, Pasadena, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/692,252

(22) Filed: Oct. 19, 2000

Related U.S. Application Data

(63) Continuation of application No. 09/339,130, filed on Jun. 24, 1999, now abandoned.

(51) Int. Cl.[7] .............................................. C10G 45/02
(52) U.S. Cl. ........................ 208/213; 208/209; 203/28; 203/32
(58) Field of Search ............................... 208/209, 213; 203/28, 32

(56) References Cited

U.S. PATENT DOCUMENTS

| | | | |
|---|---|---|---|
| 4,116,816 A | 9/1978 | Davis et al. ................ 208/209 |
| 4,194,964 A | 3/1980 | Chen et al. ................. 208/108 |
| 4,917,789 A | 4/1990 | Butler et al. .................. 208/89 |
| 5,011,593 A | 4/1991 | Ware et al. ................. 208/213 |
| 5,110,444 A | 5/1992 | Haun et al. .................... 208/89 |
| 5,114,562 A | 5/1992 | Haun et al. .................... 208/89 |
| 5,254,240 A | 10/1993 | Galiasso et al. ............ 208/112 |
| 5,266,546 A | 11/1993 | Hearn ........................ 502/300 |
| 5,292,428 A | 3/1994 | Harrison et al. ............ 208/208 |
| 5,384,297 A | 1/1995 | Prada et al. ................... 502/66 |
| 5,431,890 A | 7/1995 | Crossland et al. .......... 422/211 |
| 5,597,476 A | 1/1997 | Hearn et al. ................ 208/208 |
| 5,730,843 A | 3/1998 | Groten et al. ............... 202/158 |
| 5,779,883 A | 7/1998 | Hearn et al. ................ 208/213 |
| 5,837,130 A | 11/1998 | Crossland ................... 208/213 |
| 6,231,752 B1 * | 5/2001 | Putman ....................... 208/213 |

* cited by examiner

Primary Examiner—Walter D. Griffin
(74) Attorney, Agent, or Firm—Kenneth H. Johnson

(57) ABSTRACT

A process for the hydrodesulfurization of a diesel boiling range petroleum fraction wherein the hydrodesulfurization is carried out concurrently with a fractional distillation in a distillation column reactor containing a catalyst bed. The diesel is fed above the catalyst bed and hydrogen is fed below the bed. The heat for the distillation is provided by the heat of reaction of the hydrodesulfurization.

5 Claims, 1 Drawing Sheet

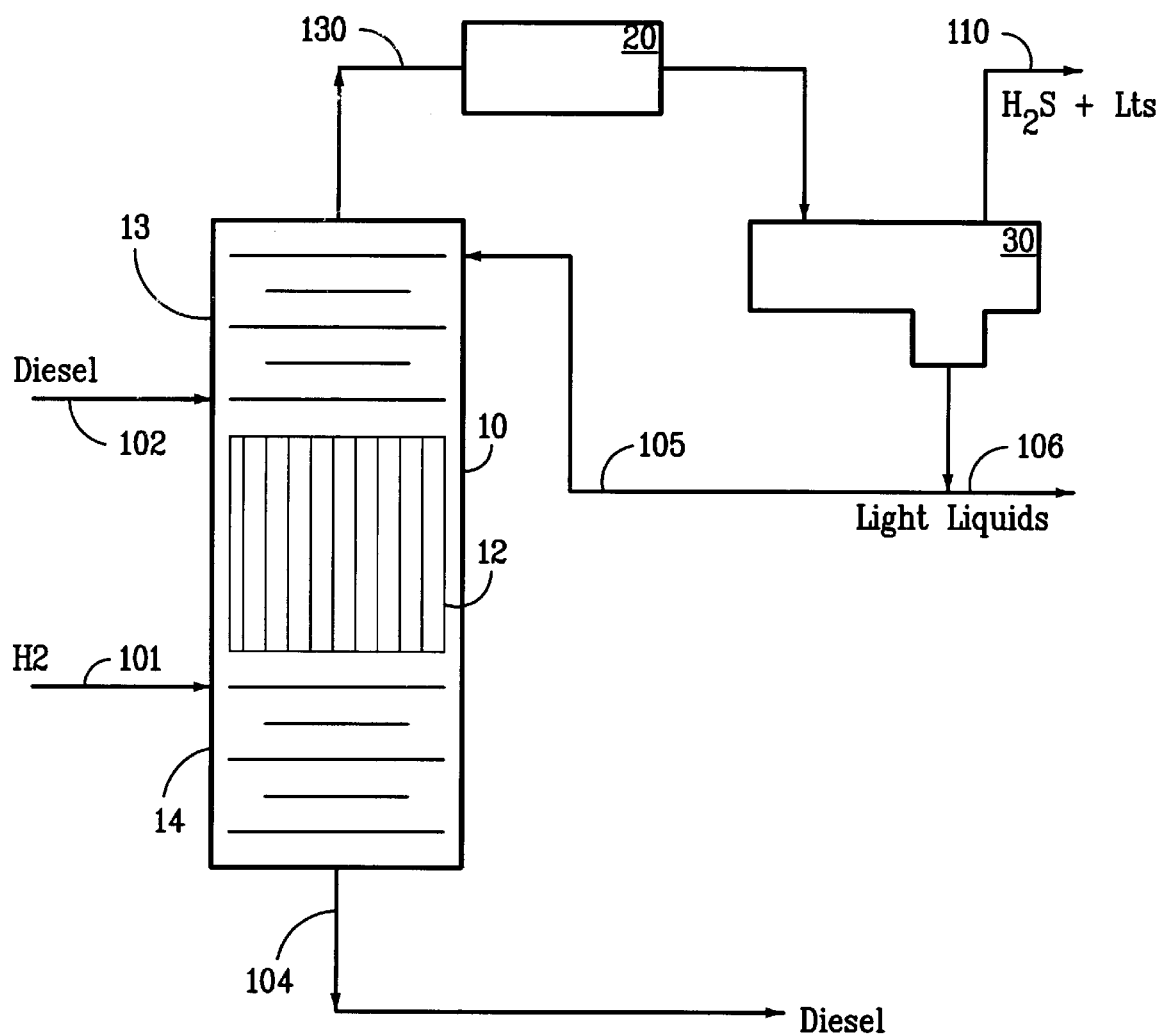

PROCESS FOR THE DESULFURIZATION OF A DIESEL FRACTION

This is a continuation of application Ser. No. 09/339,130, filed Jun. 24, 1999, now abandoned.

BACKGROUND OF THE INVENTION

1. Field of the Invention

The present invention relates generally to a process for the hydrodesulfurization of a diesel boiling range stream in a distillation column reactor. More particularly the invention relates to a process wherein a diesel boiling range fraction is fed to a distillation column reactor containing a hydrodesulfurization catalyst where the organic sulfur compounds contained in the diesel fraction are reacted with hydrogen to form $H_2S$ which can be stripped from the overhead product.

2. Related Information

Petroleum distillate streams contain a variety of organic chemical components. Generally the streams are defined by their boiling ranges which determine the compositions. The processing of the streams also affects the composition. For instance, products from either catalytic cracking or thermal cracking processes contain high concentrations of olefinic materials as well as saturated (alkanes) materials and polyunsaturated materials (diolefins). Additionally, these components may be any of the various isomers of the compounds.

Organic sulfur compounds present in these petroleum fractions are denoted as "sulfur". The amount of sulfur is generally dependent on the crude source. For instance the Saudi Arabian crudes are generally high in sulfur as are certain domestic crudes. Kuwaiti, Libyan and Louisiana crudes are generally low in sulfur. The type of sulfur compound will also depend on the boiling range of a given stream. Generally the lower boiling range fractions contain mercaptans while the higher boiling fractions contain thiophenic and heterocyclic sulfur compounds.

A diesel range fraction is defined by a boiling range of from about 450–650° F. Because the cracked diesel boiling range material from a cracked stream contains a high degree of unsaturates and cyclic compounds it is not suitable for diesel fuel without further treatment. For this reason the cracked "diesel" is sold as heating oil.

The organic sulfur compounds are almost always considered to be contaminants. They hinder downstream processing and at the very least make noxious $SO_2$ gas when burned. The degree of removal is dependent upon the use of the fraction. In the case of diesel or heating oil the desire is to prevent $SO_2$ upon combustion. For this reason the current EPA regulations call for combustible motor fuel such as gasoline, kerosene or diesel to have not more than about 500 wppm sulfur. The same limit is placed upon heating oil.

The most common method of removal of the sulfur compounds is by hydrodesulfurization (HDS) in which the petroleum distillate is passed over a solid particulate catalyst comprising a hydrogenation metal supported on an alumina base. In the past this has generally been done by downflow over fixed beds concurrently with copious quantities of hydrogen in the feed. The following reactions illustrate the typical reactions in a prior art HDS unit:

$$RSH + H_2 \rightarrow RH + H_2S \quad (1)$$

$$RCl + H_2 \rightarrow RH + HCl \quad (2)$$

$$2RN + 4H_2 \rightarrow RH + NH_3 \quad (3)$$

$$ROOH + 2H_2 \rightarrow RH + 2H_2O \quad (4)$$

Additional reactions depend upon the sulfur compounds present and the source of the fraction. For example the desulfurization of thiophenes and other heterocyclic sulfur compounds necessarily involves breaking and saturation of the rings. Typical operating conditions for the standard fixed downflow reactors are:

| Temperature, ° F. | 600–700 |
|---|---|
| Pressure, psig | 600–3000 |
| $H_2$ recycle rate, SCF/bbl | 1500–3000 |
| Fresh $H_2$ makeup, SCF/bbl | 700–1000 |

After the hydrodesulfurization is complete the product is fractionated or simply flashed to release the hydrogen sulfide and collect the now sweetened fraction. The hydrogen sulfide can be converted to elemental sulfur by conventional means.

The use of a distillation column reactor to remove sulfur from a diesel boiling range stream is disclosed in commonly owned U.S. Pat. No. 5,779,883 (see example 3) where the catalyst was placed into the middle section of a distillation column reactor and the liquid feed was to the middle of the bed or below the bed. The sulfur conversion rate was 78%.

SUMMARY OF THE INVENTION

The invention is an improvement to the process disclosed in U.S. Pat. No. 5,779,883 wherein the liquid diesel to the distillation column reactor is fed above the catalyst bed and the hydrogen fed below. In addition in this mode there is no need to add heat via a reboiler as the exothermic heat of reaction of hydrodesulfurization provides the energy necessary for the distillation. Briefly the invention is a process for the hydrodesulfurization of a diesel boiling range petroleum fraction which comprises:

(a) feeding a diesel boiling range petroleum fraction to a distillation column reactor containing a bed of hydrodesulfurization catalyst at a point above said bed;

(b) feeding hydrogen to said distillation column reactor at a point below said bed;

(c) concurrently in said distillation column reactor
  (1) distilling said diesel boiling range petroleum fraction whereby there are vaporous petroleum products rising upward through said distillation column reactor, an internal reflux of liquid flowing downward in said distillation column reactor and condensing products within said distillation column reactor, and
  (2) contacting said diesel boiling range petroleum fraction and said hydrogen in the presence of a hydrodesulfurization catalyst at a total pressure of less than about 300 psig, hydrogen partial pressure in the range of 0.1 to less than 80 psi and a temperature in the range of 400° to 800° F. whereby a portion of the organic sulfur compounds contained in said diesel boiling range petroleum fraction react with hydrogen to form $H_2S$;

(d) withdrawing an overheads from said distillation column reactor containing said $H_2S$;

(e) separating the $H_2S$ from said overheads by condensing a higher boiling fraction of said overheads;

(f) returning a portion of said condensed higher boiling fraction of said overheads to said distillation column reactor as reflux; and (g) withdrawing a bottoms product having a lower sulfur content that said diesel boiling range petroleum fraction.

In one embodiment the heat necessary for distilling said diesel boiling range petroleum fraction is provided by the heat of reaction of said organic sulfur compounds with said hydrogen.

For the purposes of the present invention, the term "catalytic distillation" includes reactive distillation and any other process of concurrent reaction and fractional distillation in a column regardless of the designation applied thereto. Several different arrangements have been disclosed to achieve the desired result. For example British Patents 2,096,603 and 2,096,604 disclose placing the catalyst on conventional trays within a distillation column. A series of U.S. patents, including particularly U.S. Pat. Nos. 4,443,559 and 4,215,011, exemplify using the catalyst as part of the packing in a packed distillation column.

The catalyst beds as used in the present invention may be described as fixed, meaning positioned in fixed area of the column and include expanded beds and ebulating beds of catalyst. The catalysts in the beds may all be the same or different so long as they carry out the function of hydrogenation as described. Catalysts prepared as distillation structures are particularly useful in the present invention.

If desired or required the $H_2S$ may be stripped from the overhead product in a separate distillation column.

BRIEF DESCRIPTION OF THE DRAWING

The FIGURE is a flow diagram in schematic form of the preferred embodiment of the invention.

DETAILED DESCRIPTION OF THE INVENTION

Referring now to the FIGURE there is shown a flow diagram in schematic form of one embodiment of the invention. A distillation column reactor 10 is provided having a bed 12 of hydrodesulfurization catalyst in a distillation reaction zone. In this embodiment the catalyst is prepared as a distillation structure. A rectification section 13 of standard distillation structure such as inert packing, bubble cap trays or sieve trays is provided above the catalyst bed 12. A stripping section 14 of standard distillation structure is provided below the catalyst bed 12. Diesel is fed above the catalyst bed 12 via flow line 102 and hydrogen is fed below the bed 12 via flow line 101. The organic sulfur compounds in the diesel react with the hydrogen to produce $H_2S$. In addition some lighter material is produced by the hydrocracking of the feed stock. Overheads, including the $H_2S$ and lighter materials, are taken via flow line 103 and passed through partial condenser 20 where the condensible material is condensed. The partially condensed overheads is then passed to the accumulator/separator 30 wherein the vapors include the $H_2S$ and $C_4$ and lighter materials. The $C_5$ and heavier material are removed and either recycled via flow line 105 to the distillation column reactor 10 or taken as product via flow line 106. Diesel product is taken as bottoms via flow line 104. The energy for the distillation is provided by the heat of reaction of the desulfurization, hydrogenation and hydrocracking which occur in the bed 12. It should be noted that the distillation column reactor combines the standard fixed bed reactor and stabilizer of conventional units. A stabilizer being a distillation column that removes any $C_5$ and lighter material that is formed during the hydrodesulfurization process.

The operation of the distillation column reactor results in both a liquid and vapor phase within the distillation reaction zone. A considerable portion of the vapor is hydrogen while a portion is vaporous hydrocarbon from the diesel boiling range fraction. Actual separation may be a secondary consideration. Within the distillation reaction zone there is an internal reflux and external reflux which cool the rising vaporous hydrocarbons condensing a portion within the bed.

Without limiting the scope of the invention it is proposed that the mechanism that produces the effectiveness of the present process is the condensation of a portion of the vapors in the reaction system, which occludes sufficient hydrogen in the condensed liquid to obtain the requisite intimate contact between the hydrogen and the sulfur compounds in the presence of the catalyst to result in their hydrogenation.

The result of the operation of the process in the catalytic distillation mode is that lower hydrogen partial pressures (and thus lower total pressures) may be used. As in any distillation there is a temperature gradient within the distillation column reactor. The lower end of the column contains higher boiling material and is thus at a higher temperature than the upper end of the column. The lower boiling fraction, which contains more easily removable sulfur compounds, is subjected to lower temperatures at the top of the column which provides for greater selectivity, that is, less hydrocracking or saturation of olefinic compounds. The higher boiling fraction is subjected to higher temperatures in the lower end of the distillation column reactor to crack open the sulfur containing ring compounds and hydrogenate the sulfur.

It is believed that the present distillation column reactor is a benefit first, because the reaction is occurring concurrently with distillation, the initial reaction products and other stream components are removed from the reaction zone as quickly as possible reducing the likelihood of side reactions. Second, because all the components are boiling the temperature of reaction is controlled by the boiling point of the mixture at the system pressure. The heat of reaction simply creates more boil up, but no increase in temperature at a given pressure. As a result, a great deal of control over the rate of reaction and distribution of products can be achieved by regulating the system pressure. A further benefit that this reaction may gain from distillation column reactions is the washing effect that the internal reflux provides to the catalyst thereby reducing polymer build up and coking.

Finally, the upward flowing hydrogen acts as a stripping agent to help remove the $H_2S$ which is produced in the distillation reaction zone.

Diesel boiling range fractions which may be treated to remove sulfur by the instant process include both straight run and cracked diesels having a boiling range of between about 450–650° F. Cracked materials can benefit from saturation of the highly unsaturated compounds contained therein but this results in higher hydrogen consumption.

The hydrogen rate to the reactor must be sufficient to maintain the reaction but below the rate which would cause flooding of the column which is understood to be the "effectuating amount of hydrogen" as that term is used herein. The mole ratio of hydrogen to sulfur compound in the feed varies according to the type of compound and the amount of hydrogen expected to be consumed by side reactions such as hydrocracking and double and triple bond saturation. Hydrogen flow rates are typically calculated as standard cubic feet per barrel of feed (SCFB) and are in the range of 300–3000 SCFB.

Surprisingly, a low total pressure, below about 300 psig, for example in the range of 0 to 200 psig is required for the hydrodesulfurization and hydrogen partial pressures of less than 100 psi down to 0.1 psi can be employed, e.g., 0.1 to 100 psi preferably about 0.5 to 80 psi. The preferred hydrogen partial pressure is less than 100 psi. Typical overhead temperatures are between 350° to 650° F. with bottoms temperatures in the range of 500° to 850° F.

Catalysts which are useful for the hydrodesulfurization reaction include Group VIII metals such as cobalt, nickel, palladium, alone or in combination with other metals such as molybdenum or tungsten on a suitable support which may be alumina, silica-alumina, titania-zirconia or the like. Normally the metals are provided as the oxides of the metals supported on extrudates or spheres and as such are not generally useful as distillation structures.

The catalyst may contain components from Group V, VIB, VIII metals of the Periodic Table or mixtures thereof. The use of the distillation system reduces the deactivation and provides for longer runs than the fixed bed hydrogenation units of the prior art. The Group VIII metal provides increased overall average activity. Catalysts containing a Group VIB metal such as molybdenum and a Group VIII such as cobalt or nickel are preferred. Catalysts suitable for the hydrodesulfurization reaction include cobalt-molybdenum, nickel-molybdenum and nickel-tungsten. The metals are generally present as oxides supported on a neutral base such as alumina, silica-alumina or the like. The metals are reduced to the sulfide either in use or prior to use by exposure to sulfur compound containing streams. The catalysts may also catalyze the hydrogenation of the olefins and polyolefins contained within the light cracked naphtha and to a lesser degree the isomerization of some of the mono-olefins. The hydrogenation, especially of the mono-olefins in the lighter fraction may not be desirable.

The properties of a typical hydrodesulfurization catalyst are shown in Table I below.

TABLE I

| Manufacture | Criterion Catalyst Co. |
|---|---|
| Designation | C-448 |
| Form | Tri-lobe Extrudate |
| Nominal size | 1.2 mm diameter |
| Metal, Wt. % | |
| Cobalt | 2–5% |
| Molybdenum | 5–20% |
| Support | Alumina |

The catalyst typically is in the form of extrudates having a diameter of ⅛, 1/16 or 1/32 inches and an L/D of 1.5 to 10. The catalyst also may be in the form of spheres having the same diameters. In their regular form they form too compact a mass and must then be prepared in the form of a catalytic distillation structure. The catalytic distillation structure must be able to function as catalyst and as mass transfer medium. The catalyst must be suitably supported and spaced within the column to act as a catalytic distillation structure, as disclosed in U.S. Pat. No. 5,266,546, where the catalyst is contained in a woven wire mesh structure, which is hereby incorporated by reference. Other catalytic distillation structures useful for this purpose are disclosed in U.S. Pat. Nos. 4,731,229, 5,073,236, 5,266,546, 5,431,890 and 5,730,843 which are incorporated by reference.

EXAMPLE

In the following example a catalytic structure was prepared according to U.S. Pat. No. 5,431,890, which is incorporated herein, containing 20 pounds of the catalytic material described in TABLE I and placed in the middle 40 feet of a 50 foot tall 3 inch diameter distillation column reactor. There were 5 feet of inert packing in a rectifying section above the catalyst and 0 feet of inert packing in a stripping section below the catalyst. Liquid diesel feed was fed to the distillation column reactor at a point above the catalyst and hydrogen was fed below the catalyst. The conditions and results are shown in TABLE II below:

TABLE II

| Type Feed | Straight run diesel |
|---|---|
| Total Pressure, psig | 200 |
| Hydrogen feed rate, SCFB | 1500 |
| Hydrogen partial pressure, psi | 80 |
| Liquid feed rate, lbs/hr | 40 |
| Overhead rate, lbs/hr | 4 |
| Bottoms rate, lbs/hr | 36 |
| Reflux rate, lbs/hr | 20 |
| WHSV, lbs diesel/hr/lb catalyst | 2 |
| Temperatures, ° F. | |
| Overhead | |
| Mid catalyst bed | |
| Bottoms | |
| Feed sulfur content, wppm | 12000 |
| Overhead sulfur content, wppm, | 3752 |
| Bottoms sulfur content, wppm | 986 |
| Sulfur removal, % | 90 |

The invention claimed is:

1. A process for the hydrodesulfurization of a diesel boiling range petroleum fraction which comprises:
   (a) feeding a diesel boiling range petroleum fraction containing organic sulfur compounds to a distillation column reactor containing a bed of hydrodesulfurization catalyst at a point above said bed;
   (b) feeding hydrogen to said distillation column reactor at a point below said bed;
   (c) concurrently in said distillation column reactor
      (1) distilling said diesel boiling range petroleum fraction whereby there are vaporous petroleum products rising upward through said distillation column reactor, an internal reflux of liquid flowing downward in said distillation column reactor and condensing products within said distillation column reactor, and
      (2) contacting said diesel boiling range petroleum fraction and said hydrogen in the presence of a hydrodesulfurization catalyst at a total pressure of less than about 300 psig, hydrogen partial pressure in the range of 0.1 to less than 100 psi and a temperature in the range of 400° to 800° F. whereby a portion of the organic sulfur compounds contained in said diesel boiling range petroleum fraction react with hydrogen to form $H_2S$;
   (d) withdrawing an overheads from said distillation column reactor containing said $H_2S$;
   (e) separating the $H_2S$ from said overheads by condensing a higher boiling fraction of said overheads;
   (f) returning a portion of said condensed higher boiling fraction of said overheads to said distillation column reactor as reflux; and
   (g) withdrawing a bottoms product having a lower sulfur content than said diesel boiling range petroleum fraction.

2. The process according to claim 1 wherein the heat necessary for distilling said diesel boiling range petroleum fraction is provided by the heat of reaction of said organic sulfur compounds with said hydrogen.

3. The process according to claim 1 wherein the total pressure is 200 psig, the catalyst bed temperature is 640° F.

the weight hourly space velocity is 2.0 and the hydrogen partial pressure is 80 psi.

4. The process according to claim 1 wherein $C_5$ and lighter material is taken as said overheads.

5. A process for the hydrodesulfurization of a diesel boiling range petroleum fraction which comprises:
 (a) feeding a diesel boiling range petroleum fraction containing organic sulfur compounds to a distillation column reactor containing a bed of hydrodesulfurization catalyst at a point above said bed;
 (b) feeding hydrogen to said distillation column reactor at a point below said bed;
 (c) concurrently in said distillation column reactor
  (1) distilling said diesel boiling range petroleum fraction whereby there are vaporous petroleum products rising upward through said distillation column reactor, an internal reflux of liquid flowing downward in said distillation column reactor and condensing products within said distillation column reactor, and
  (2) contacting said diesel boiling range petroleum fraction and said hydrogen in the presence of a hydrodesulfurization catalyst at a total pressure of less than about 300 psig, hydrogen partial pressure in the range of 0.1 to less than 100 psi and a temperature in the range of 400° to 800° F. whereby a portion of the organic sulfur compounds contained in said diesel boiling range petroleum fraction react with hydrogen to form $H_2S$;
  (3) wherein the heat necessary for distilling said diesel boiling range petroleum fraction is provided by the heat of reaction of said organic sulfur compounds with said hydrogen;
 (d) withdrawing an overheads from said distillation column reactor containing said $H_2S$;
 (e) separating the $H_2S$ from said overheads by condensing a higher boiling fraction of said overheads;
 (f) returning a portion of said condensed higher boiling fraction of said overheads to said distillation column reactor as reflux; and
 (g) withdrawing a bottoms product having a lower sulfur content than said diesel boiling range petroleum fraction.

\* \* \* \* \*